United States Patent
Abe et al.

(10) Patent No.: US 8,207,935 B2
(45) Date of Patent: Jun. 26, 2012

(54) ELECTROPHORETIC DISPLAY DEVICE AND METHOD OF MANUFACTURING ELECTROPHORETIC DISPLAY DEVICE

(75) Inventors: Hiroyuki Abe, Matsumoto (JP); Yasuhiro Shimodaira, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 703 days.

(21) Appl. No.: 12/371,214

(22) Filed: Feb. 13, 2009

(65) Prior Publication Data
US 2009/0213047 A1 Aug. 27, 2009

(30) Foreign Application Priority Data
Feb. 21, 2008 (JP) ................................ 2008-039977

(51) Int. Cl.
G09G 3/34 (2006.01)
(52) U.S. Cl. ...................................................... 345/107
(58) Field of Classification Search .................. 345/107; 359/296; 204/450
See application file for complete search history.

(56) References Cited

U.S. PATENT DOCUMENTS

| | | | | |
|---|---|---|---|---|
| 6,639,580 B1* | 10/2003 | Kishi et al. | ..................... | 345/107 |
| 6,956,691 B2* | 10/2005 | Kaneko et al. | ................ | 359/296 |
| 7,843,626 B2* | 11/2010 | Amundson et al. | ........... | 359/296 |
| 2001/0030639 A1* | 10/2001 | Goden | ......................... | 345/107 |
| 2004/0189591 A1* | 9/2004 | Breuil | ............................ | 345/156 |
| 2007/0070030 A1* | 3/2007 | Zang et al. | .................... | 345/107 |
| 2008/0136772 A1* | 6/2008 | Minami | ....................... | 345/107 |
| 2008/0239459 A1* | 10/2008 | Kang et al. | .................... | 359/296 |
| 2008/0239461 A1* | 10/2008 | Maeda | .......................... | 359/296 |

FOREIGN PATENT DOCUMENTS
JP 2003-84314 A 3/2003
JP 2008-249792 A 10/2008
* cited by examiner Primary Examiner — Joseph Haley
Assistant Examiner — Nicholas Lee
(74) Attorney, Agent, or Firm — AdvantEdge Law Group, LLC

(57) ABSTRACT

An electrophoretic display device includes pixels each including an electrophoretic element that has a pixel electrode, an opposing electrode that faces the pixel electrode, and an electrophoretic layer that is configured by electrophoretic particles disposed between the pixel electrode and the opposing electrode. The pixels are arranged two-dimensionally, and an insulating layer formed of a photosensitive insulating material is disposed in areas between the adjacent pixel electrodes.

10 Claims, 14 Drawing Sheets

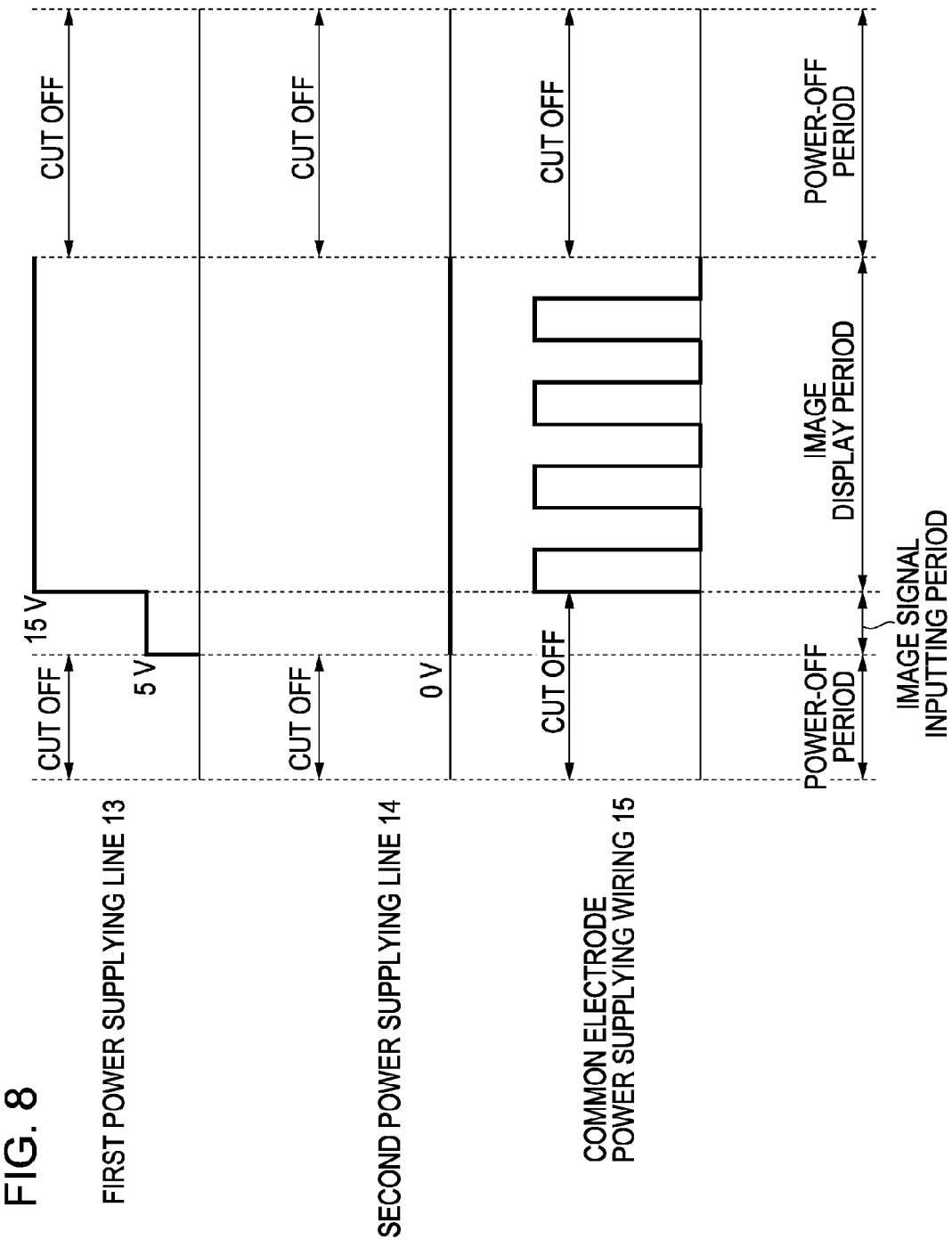

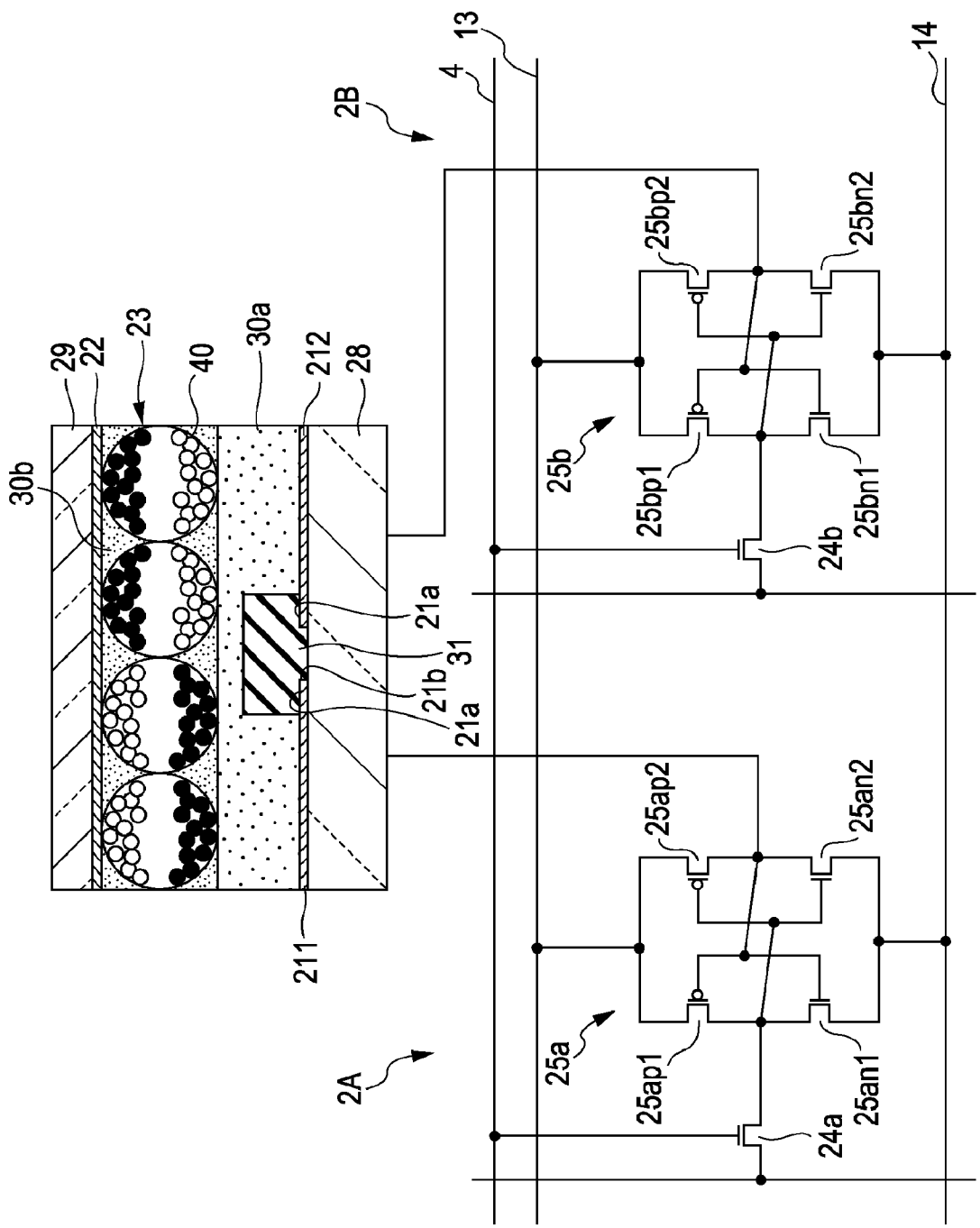

ELECTROPHORETIC DISPLAY DEVICE AND METHOD OF MANUFACTURING ELECTROPHORETIC DISPLAY DEVICE

BACKGROUND

1. Technical Field

The present invention relates to an electrophoretic display device and a method of manufacturing electrophoretic display device.

2. Related Art

Generally, electrophoretic display devices that have an electrophoretic dispersion liquid including a liquid dispersion medium and electrophoretic particles and utilize change of optical characteristics of the electrophoretic dispersion liquid according to application of an electric field for changing the distribution state of the electrophoretic particles have been known. The electrophoretic display devices do not need a back light, and accordingly, cost reduction and a decrease in the thickness can be achieved. In addition, the electrophoretic display devices have a memory effect of display in addition to a wide viewing angle and high contrast, and thus, the electrophoretic display devices have attracted attention as next-generation display devices.

In order to display an image by using the electrophoretic display devices, an image signal is temporarily stored in a memory circuit through a switching element. Then, the image signal stored in the memory circuit is directly input to a pixel electrode (a first electrode) so as to apply an electric potential to a pixel electrode. Then, an electric potential difference between the pixel electrode and an opposing electrode (a second electrode) is generated. Accordingly, an electrophoretic element is operated so as to display an image (for example, see JP-A-2003-84314).

However, in order to display an image by using the electrophoretic display device, a voltage, for example, of about 15 V is needed to be applied between electrodes that pinch the electrophoretic particles. In such a case, when different (inverted) colors such as black and white colors are displayed by adjacent pixels, different electric potentials are applied to the pixel electrodes of the adjacent pixels. Then, a large electric potential is generated between the adjacent pixel electrodes, and thereby a leakage current is generated between the adjacent pixel electrodes through a conductive adhesive layer disposed on the pixel electrode or the like.

Even when the leakage current is small for each one pixel, the leakage current becomes large for the entire display unit of the electrophoretic display device, and accordingly, the power consumption increases. In addition, when the inverted display area increases and display becomes complex in accompaniment with the increase of the inverted display area, the power consumption increases.

In addition, the pixel electrode may cause a chemical reaction due to generation of the leakage current. Accordingly, particularly when the electrophoretic display device is used for a long time, the reliability thereof may deteriorate.

SUMMARY

An advantage of some aspects of the invention is that it provides an electrophoretic display device of which reliability is improved by suppressing leakage currents between pixels and a method of manufacturing the electrophoretic display device.

According to a first aspect of the invention, there is provided an electrophoretic display device including a first pixel electrode, a second pixel electrode adjacent to the first pixel electrode, an opposing electrode facing the first and second pixel electrodes, an electrophoretic layer configured by electrophoretic particles, the electrophoretic layer being disposed between the first and second pixel electrodes and the opposing electrode, and an insulating layer including a photosensitive insulating material, and disposed in between the first pixel electrode and the second pixel electrode.

According to the above-described electrophoretic display device, the insulating layer disposed in the areas between the pixel electrodes cuts off the leakage currents between the adjacent pixel electrodes, that is, a horizontal electric field, and accordingly, generation of the leakage currents between the adjacent pixels is suppressed. In addition, the insulating layer is formed of the photosensitive insulating material, and accordingly, formation of the insulating layer, that is, patterning the insulating layer can be performed with high precision in an easy manner by using an existing exposure and development process. As a result, reliability of the electrophoretic display device is improved by preventing deterioration of display performance due to the leakage current and preventing an increase in the consumption current. In addition, the insulating layer used for suppressing the leakage current can be easily produced.

In the above-described electrophoretic display device, it may be configured that a conductive adhesive layer is disposed between the first and second pixel electrodes and the electrophoretic layer and the thickness of the insulating layer is equal to or larger than 1 μm and is equal to or smaller than the thickness of the conductive adhesive layer.

The reason for the above-described configuration of the thickness of the insulating layer is as follows. When the thickness of the insulating layer is smaller than 1 μm, an advantage of cutting off a leakage current between the adjacent pixels may not be sufficiently acquired, and driving elements and the like that are disposed, for example, below the pixel electrode may be damaged by light emission for performing exposure of the photosensitive insulating material in a manufacturing process thereof. On the other hand, when the thickness of the insulating layer exceeds the thickness of the conductive adhesive layer, an exposure time for patterning the insulating layer is lengthened, and accordingly, the productivity decreases. In addition, in such a case, the stress of the insulating layer increases, and thus, the film may be detached.

In addition, in the above-described electrophoretic display device, the photosensitive insulating material may be a photosensitive acrylic resin.

In such a case, the photosensitive acrylic resin can be directly patterned without using a resist by performing an existing exposure and development process, and accordingly, a patterning process can be performed with high precision in an easy manner.

In addition, in the above-described electrophoretic display device, the insulating layer may contact with a side end face of the first and second pixel electrodes.

In such a case, the insulating layer cuts off the leakage currents flowing from the side end faces of the pixel electrodes, and accordingly, the generation of the leakage currents can be suppressed more sufficiently.

In addition, in the above-described electrophoretic display device, the insulating layer may cover surfaces of the first and second pixel electrodes that face the opposing electrode.

In such a case, the insulating layer is disposed so as to cover the edge part of the surface of the pixel electrode, and thus, the leakage current from the pixel electrode is generated not from the edge part covered with the insulating layer but from an exposed part. Accordingly, a distance between the pixel electrode and a pixel electrode adjacent thereto becomes long, and therefore the leakage current is not easily generated.

In addition, in the above-described electrophoretic display device, the insulating layer may be disposed continuously on edge parts of the surfaces of the first and second pixel electrodes and between the adjacent pixel electrodes.

In such a case, between the adjacent pixels, the leakage current from each pixel electrode is generated not from the edge part that is covered with the insulating layer but from the exposed part. Accordingly, the path of the leakage current is lengthened (far apart), and thus, the leakage current is not easily generated therebetween.

In addition, in the above-described electrophoretic display device, the electrophoretic layer may include a microcapsule that encloses the electrophoretic particles, and the microcapsule is disposed over the first and second pixel electrode with the conductive adhesive layer interposed therebetween.

In such a case, the electrophoretic particles are distributed uniformly within the electrophoretic layer, and accordingly, uniform image display can be performed based on the electric potential difference between both the electrodes.

According to a second aspect of the invention, there is provided a method of manufacturing an electrophoretic display device, the method includes forming a first pixel electrode and a second electrode over a first substrate, the second pixel electrode being adjacent to the first pixel electrode, forming a photosensitive insulating material layer by disposing a photosensitive insulating material over the first and the second pixel electrode; and forming an insulating layer in between the first and second pixel electrodes by exposing and developing the photosensitive insulating material layer for patterning the photosensitive insulating material, forming an opposing electrode over a second substrate, and disposing a electrophoretic layer between the first substrate and the second substrate.

According to the above-described method of manufacturing the electrophoretic display device, the insulating layer formed of the photosensitive insulating layer is formed in the area between adjacent pixel electrodes, and thus the insulating layer cuts off the leakage current between the adjacent pixel electrodes, that is, a horizontal electric field. Accordingly, the generation of the leakage currents between the pixels can be suppressed. In addition, the insulating layer is formed of the photosensitive insulating material, and accordingly, formation of the insulating layer, that is, patterning the insulating layer can be performed with high precision in an easy manner by using an existing exposure and development process. As a result, reliability of the electrophoretic display device is improved by preventing deterioration of display performance due to the leakage current and preventing an increase in the consumption current. In addition, the insulating layer used for suppressing the leakage current can be easily produced.

In the above described method of manufacturing an electrophoretic display device, bonding the first and second pixel electrode and the electrophoretic layer by interposing a conductive adhesive layer therebetween may be further included, and, in the forming of the insulating layer, the insulating layer may be formed to have a thickness equal to or larger than 1 μm and is equal to or smaller than the thickness of the conductive adhesive layer.

In such a case, as described above, an advantage of cutting off the leakage current can be sufficiently acquired, and accordingly, the possibility that the driving elements and the like, which are disposed below the pixel electrode, are damaged decreases further. In addition, the possibility that productivity decreases due to a long exposure time or the film of the insulating layer is detached markedly decreases.

In the above described method of manufacturing an electrophoretic display device, in the forming of the insulating layer, a photosensitive acrylic resin may be used as the photosensitive insulating material.

In such a case, the photosensitive acrylic resin can be directly patterned without using a resist by performing an existing exposure and development process, and accordingly, the patterning process can be performed with high precision in an easy manner.

BRIEF DESCRIPTION OF THE DRAWINGS

The invention will be described with reference to the accompanying drawings, wherein like numbers reference like elements.

FIG. 8 is a diagram showing a timing chart for the electrophoretic display device.

FIG. 9 is a schematic diagram showing adjacent pixels of the display unit.

DESCRIPTION OF EXEMPLARY EMBODIMENTS

Figure 1:
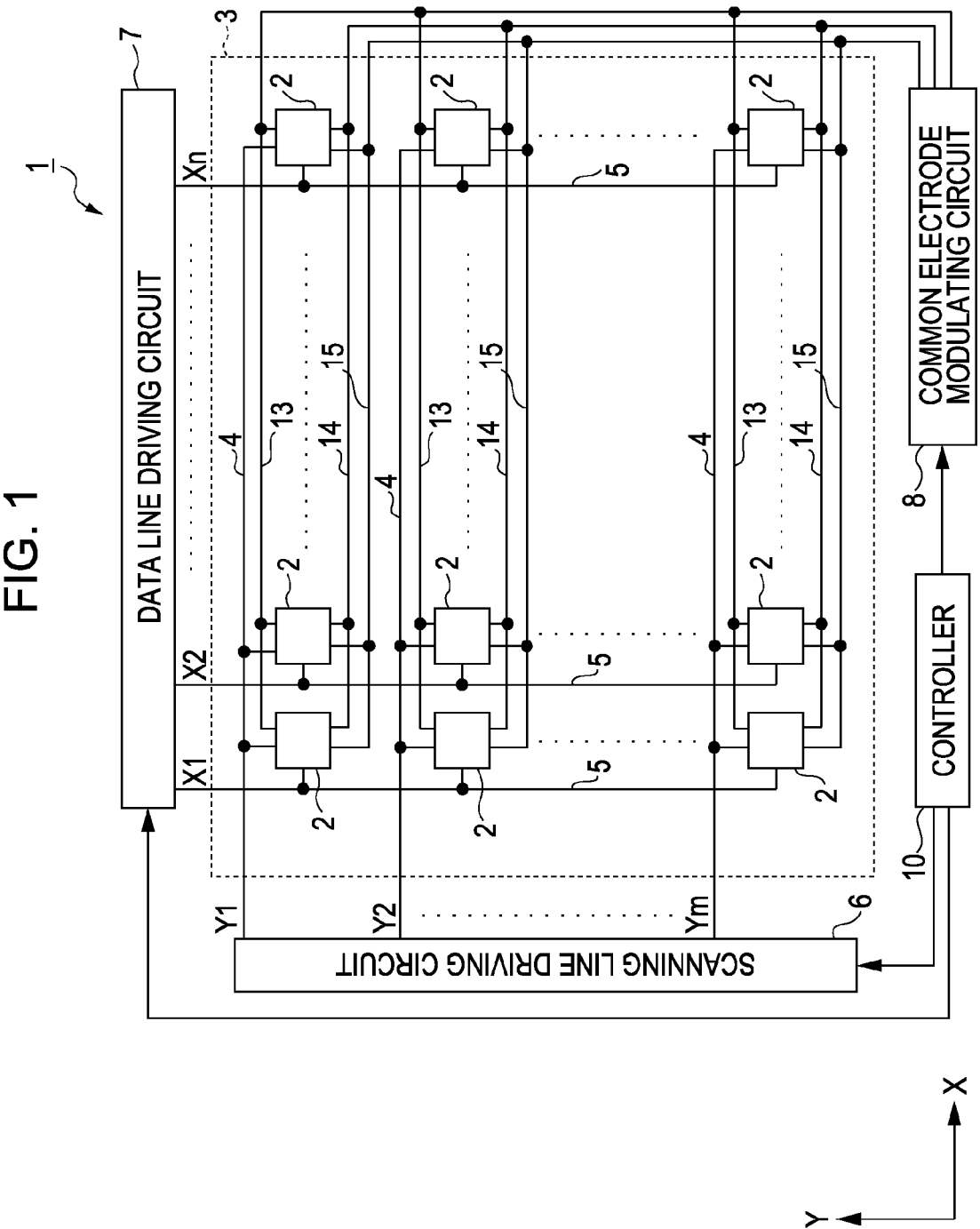
FIG. 1 is a diagram showing the configuration of an electrophoretic display device according to a first embodiment of the invention.

Hereinafter, embodiments of the invention will be described with reference to the accompanying drawings. In the drawings below, in order to represent each member in a recognizable size, the scale thereof is appropriately changed.

First Embodiment

FIG. 1 is a diagram showing the configuration of an electrophoretic display device according to a first embodiment of the invention. In FIG. 1, reference numeral 1 denotes the electrophoretic display device. The electrophoretic display device 1 is configured to include a display unit 3, a scanning line driving circuit 6, a data line driving circuit 7, a common power modulating circuit 8, and a controller 10.

In the display unit 3, M in the Y-axis direction X N in the X-axis direction pixels 2 are formed in a matrix shape. The scanning line driving circuit 6 is connected to the pixels 2 through a plurality of scanning lines 4 (Y1, Y2, ..., Ym) that extends along the display unit 3 in the X-axis direction. In addition, the data line driving circuit 7 is connected to the pixels 2 through a plurality of data lines 5 (X1, X2, ..., Xn) that extends along the display unit 3 in the Y-axis direction. The common power modulating circuit 8 is connected to the pixels 2 through common electrode power supplying wirings 15. The scanning line driving circuit 6, the data line driving circuit 7, and the common power modulating circuit 8 are configured to be controlled by the controller 10. In addition, power supplying lines 13 and 14 and the common electrode power supplying wirings 15 are used as common wirings of the pixels 2.

Figure 2:
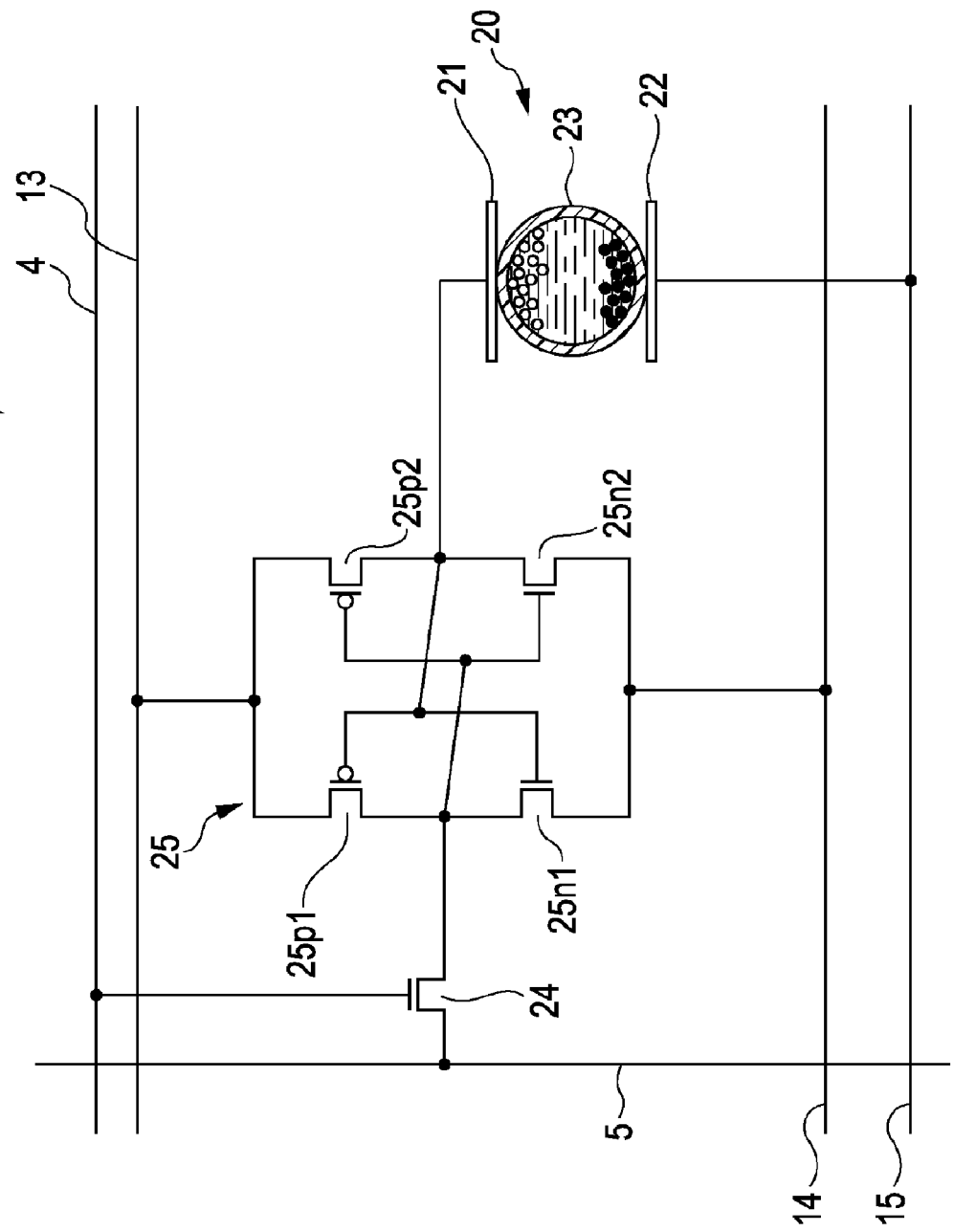
FIG. 2 is a diagram showing the circuit configuration of a pixel according to the first embodiment.

Each pixel 2 of which circuit configuration is shown in FIG. 2 is configured to include a driving TFT (Thin Film Transistor, a pixel switching element) 24, an SRAM (Static Random Access Memory, a memory circuit) 25, and an electrophoretic element 20. The electrophoretic element 20 is formed by a pixel electrode 21, a common electrode (an opposing electrode) 22, and an electrophoretic layer 23.

The driving TFT 24 is configured by an N-MOS (Negative Metal Oxide Semiconductor). The scanning line 4 is connected to the gate of the driving TFT 24, the data line 5 is connected to the source of the driving TFT, and the SRAM 25 is connected to the drain of the driving TFT. The driving TFT 24 connects the data line 5 and the SRAM 25 during a period in which a selection signal is input from the scanning line driving circuit 6 through the scanning line 4. The driving TFT is configured to input an image signal, which is input from the data line driving circuit 7 through the data line 5, to the SRAM 25.

The SRAM 25 is configured by two P-MOSs (Positive Metal Oxide Semiconductors) 25p1 and 25p2 and two N-MOSs 25n1 and 25n2. To the source of the P-MOSs 25p1 and 25p2, a first power supplying line 13 is connected, and to the source of the N-MOSs 25n1 and 25n2, a second power supplying line 14 is connected.

To the drain of the PMOS 25p1 of the SRAM 25 and the drain of the N-MOS n1, the gates of the driving TFT 24 and the P-MOS 25p2 and the gate of the N-MOS 25n2 are connected. In addition, to the drain of the P-MOS 25p2 of the SRAM 25 and the drain of the N-MOS n2, the gate of the P-MOS 25p1 and the gate of the N-MOS 25n1 are connected.

Under the above-described configuration, the SRAM 25 is configured to maintain the image signal transmitted from the driving TFT 24 and input the image signal to the pixel electrode 21.

The electrophoretic element 20 displays an image based on an electric potential difference between the pixel electrode 21 and the common electrode 22. To the common electrode 22, the common electrode power supplying wiring 15 is connected.

Figure 3:
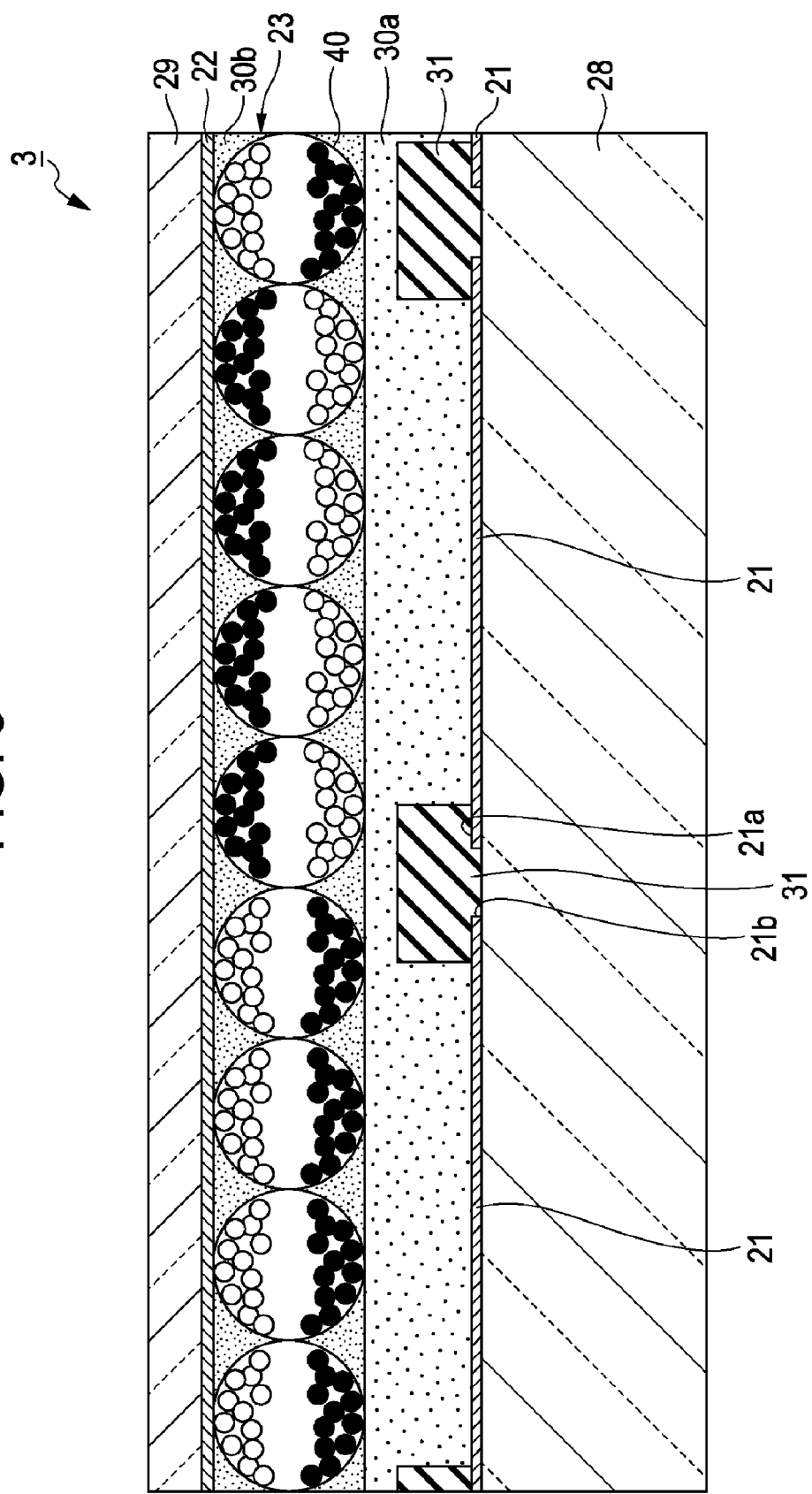
FIG. 3 is a partial cross-section view of a display unit according to the first embodiment.

FIG. 3 is a cross-section view of major parts of the display unit 3 of the electrophoretic display device 1. The display unit 3 is configured to include an electrophoretic layer 23 between a component substrate (a first substrate) 28 having the pixel electrode 21 and an opposing substrate (a second substrate) 29 having the common electrode 22. The electrophoretic layer 23 is configured by a plurality of microcapsules 40 and is formed by fixing the microcapsules 40 between both substrates 28 and 29 by using an adhesive agent.

In other words, between the pixel electrode 21 of the component substrate 28 and the electrophoretic layer 23, an adhesive layer (a conductive adhesive layer) 30a formed of an adhesive agent having conductivity is disposed. In addition, between the common electrode 22 of the opposing substrate 29 and the electrophoretic layer 23, a binder layer 30b formed of a binder (an adhesive agent) is disposed. The conductivity of the adhesive layer 30a is set sufficiently high, so that the responsiveness of electrophoretic particles located inside the microcapsules 40 increases for increasing the speed of display conversion, as will described later. In this embodiment, the adhesive layer 30a is formed to have a small thickness of about 20 μm. Accordingly, resistance between the pixel electrode 21 and the microcapsules 40 is low enough, and accordingly, the conductivity therebetween is sufficiently high.

The component substrate 28 is acquired by forming the above-described driving TFT 24, the SRAM 25, and various wirings not shown in the figure on the inner face of a rectangular shaped substrate formed of a synthetic resin, glass, or the like and additionally forming a flattening layer (not shown) formed of an acrylic resin or the like thereon. Then, the pixel electrode 21 is formed so as to be connected to the SRAM 25 on the inner face flattened by the flattening layer. The pixel electrode 21 is independently disposed for each pixel 2 and has a rectangular shape in the plan view. The pixel electrodes are formed of Al (Aluminum), Cu (Copper), AlCu, or the like in the shape of a matrix. In this embodiment, the pixel electrode 21 is formed of AlCu that has superior conductivity and superior corrosion resistance.

The opposing substrate 29 becomes a side for displaying an image. The opposing substrate is formed of a transparent material such as a transparent resin or glass in a rectangular shape. On the inner side of the opposing substrate 29, the common electrode 22 that is common to all the pixels 2 is disposed. The common electrode 22 is formed of a transparent conductive material and, for example, is formed of, ITO (Indium Tin Oxide), IZO (Indium Zinc Oxide), MgAg (Magnesium Silver), or the like.

Between the pixel electrodes 21 and 21, that is, in an area located between adjacent pixels 21 and 21, an insulating layer 31 is formed. The insulating layer 31 is formed of a photosensitive insulating material. In particular, as the photosensitive insulating material, a photosensitive acrylic resin, polysilazane, or the like is used, and particularly, the photosensitive acrylic resin is appropriately used. Thus, in this embodiment, it is assumed that the insulating layer 31 is formed of the photosensitive acrylic resin. The photosensitive acrylic resin is coated on the component substrate 28 so as to cover the pixel electrodes 21 by roller coating, spin coating, or the like and then, is patterned by performing an exposure process and a development process.

Figure 4:
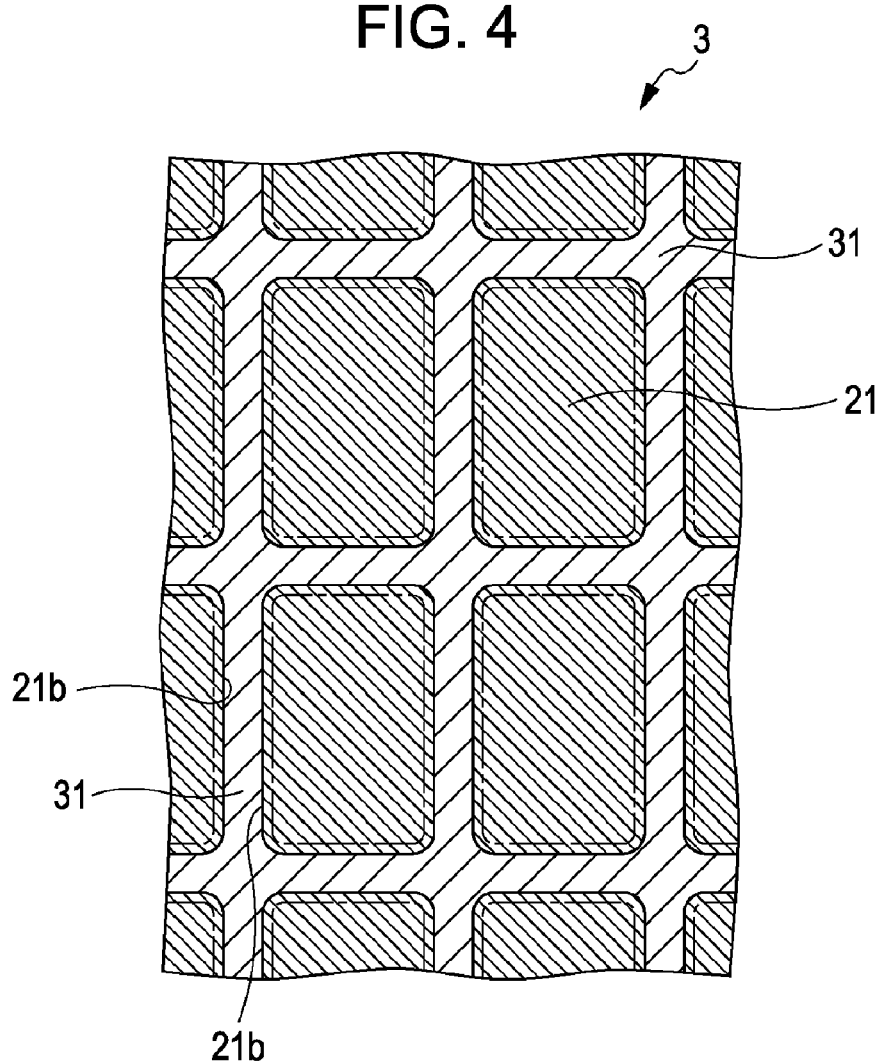
FIG. 4 is a plan view of a pixel electrode and an insulating layer according to the first embodiment.

According to this embodiment, the insulating layer 31 is continuously formed on the edge parts 21a of the surfaces of the adjacent pixel electrodes 21 and 21 and between the pixel electrodes 21 and 21. In other words, the insulating layer 31 is disposed so as to be brought into contact with the side end faces 21b of the adjacent pixel electrodes 21 and 21 with the surface of the insulating layer protruding from the surface of the pixel electrodes 21 to the electrophoretic layer 23 side. In other words, as shown in FIG. 4 that is a plan view showing the insulating layer 31 and the pixel electrodes 21, the insulating layer 31 is formed along areas between the pixel electrodes 21 in the shape of a lattice in the plan view, and a part of the insulating layer is formed on the pixel electrodes 21 so as to frame the surface parts of the pixel electrodes 21 in the shape of casing trims.

Here, it is preferable that the thickness of the insulating layer 31, that is, the height protruding from the surface of the pixel electrode 21 to the electrophoretic layer 23 side is formed to be equal to or larger than 1 μm and is equal to or smaller than the thickness of the adhesive layer 30a, that is, about 20 μm. When the thickness of the insulating layer is smaller than 1 μm, an advantage of cutting off a leakage current between the adjacent pixels 21 and 21 may not be sufficiently acquired, and the driving TFT 24, the SRAM 25, and the like that are disposed below the pixel electrode 21 may be damaged by light emission for performing exposure of the photosensitive insulating material (the photosensitive acrylic resin) in a manufacturing process thereof, as will be described later.

On the other hand, when the thickness of the insulating layer 31 exceeds the thickness of the adhesive layer 30a, an exposure time for patterning the insulating layer 31 is lengthened, as will be described later, and accordingly, the productivity decreases. In addition, in such a case, the stress of the insulating layer 31 increases, and thus, the film may be detached. In addition, when the insulating layer 31 protrudes to the electrophoretic layer 23 side, passing through the adhesive layer 30a, the microcapsules 40 may be damaged. However, the microcapsules 40 have sufficient flexibility, and thus, even when the insulating layer 31 protrudes to the electrophoretic layer 23 side more or less, the microcapsules are not directly damaged. According to this embodiment, the height protruding from the surface of the pixel electrode 21 to the electrophoretic layer 23 side is set to about 1.8 μm.

The microcapsules 40 that constitute the electrophoretic layer 23 are formed of a transparent high molecular resin such as an acryl resin including polymethylmethacrylate, polyethylmethacrylate, or the like, urea resin, gum Arabic, or the like and, for example, are formed to have a diameter of about 50 μm. The microcapsules 40 are pinched by the pixel electrodes 21 and the common electrodes 22 as described above and are fixed on the electrodes, that is, on the substrates by the adhesive layer 30a and the binder layer 30b. In addition, a plurality of the microcapsules 40 is configured to be arranged within one pixel 2 vertically and horizontally. In addition, between the microcapsules 40, binders constituting the binder layer 30b are disposed so as to fill the gap therebetween.

Figure 5:
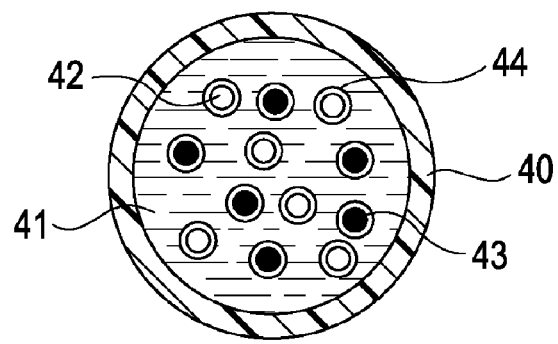
FIG. 5 is a diagram showing the configuration of a microcapsule according to the first embodiment.

Inside the microcapsule 40, as shown in FIG. 5, a dispersion medium 41 and a plurality of white particles 42 and a plurality of black particles 43 as electrophoretic particles are enclosed.

As the dispersion medium 41, an alcohol-based solvent such as water, methanol, ethanol, isopropanol, butanol, octanol, or methyl cellosolve; a variety of esters such as acetic ethyl or acetic butyl; ketone such as acetone, methylethylketone, or methylisobutylketone; aliphatic hydrocarbon such as pentane, hexane, or octane; cycloaliphatic hydrocarbon such as cyclohexane or methylcyclohexane; aromatic hydrocarbon including benzene having a long-chain alkyl group such as benzene, toluene, xylene, hexylbenzene, hebuthylbenzene, octylbenzene, nonylbenzene, decylbenzene, undecylbenzene, dodecylbenzene, tridecylebenzene, or tetradecylbenzene; halogenated hydrocarbon such as methylene chloride, chloroform, carbon tetrachloride, or 1,2-dichloroethane; carboxylate; or other kinds of oils can be used in the form of a single material or a mixture formed by mixing surfactant or the like into the above-described material. The dispersion medium 41 is a liquid that disperses the white particles 42 and the black particles 43 inside the microcapsule 40.

The white particles 42 are particles (polymer particles or colloids) made of white pigment such as titanium dioxide, zinc oxide, or antimony trioxide and, for example, are charged negatively. The black particles 43 are particles (polymer particles or colloids) made of black pigment such as aniline black or carbon black and, for example, are charged positively.

In addition, a charge control agent containing particles of an electrolyte, a surfactant, metal soap, a resin, rubber, oil, varnish, compound, or the like; a dispersant such as a titanium-coupling agent, an aluminum-coupling agent, and a silane-coupling agent; a lubricant; a stabilizing agent; or the like may be added to the above-described pigment, as is needed.

In addition, the specific gravities of the electrophoretic particles (the white particles 42 and the black particles 43) are set to be almost the same as that of the dispersion medium 41 that disperses the electrophoretic particles.

Since the white particles 42 and the black particles 43 are charged negatively or positively as described above, the white and black particles are configured to move (electrophoresis) in the middle of an electric field that is generated based on an electric potential difference between the pixel electrode 21 and the common electrode 22 inside the dispersion medium 41. Here, the white particles 42 and the black particles 43 are covered with ions included in the solvent, and thus, an ion layer 44 is formed on the surface of each particle. When an electric field having a frequency equal to or higher than 10 kHz is applied, the charged particles such as the white particles 42 or the black particles 43 scarcely respond to the electric field and scarcely move. On the other hand, the ions located in the peripheries of the charged particles have a diameter that is much smaller than that of the charged particles. Accordingly, when an electric field having a frequency equal to or higher than 10 kHz is applied to the ions, the ions move in response to the electric field.

Figure 6A:
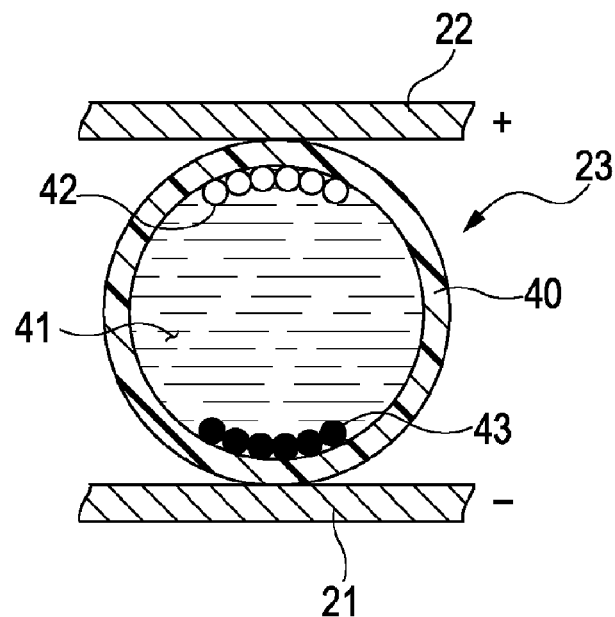
FIGS. 6A and 6B are diagrams for describing the operation of the microcapsule.
Figure 6B:
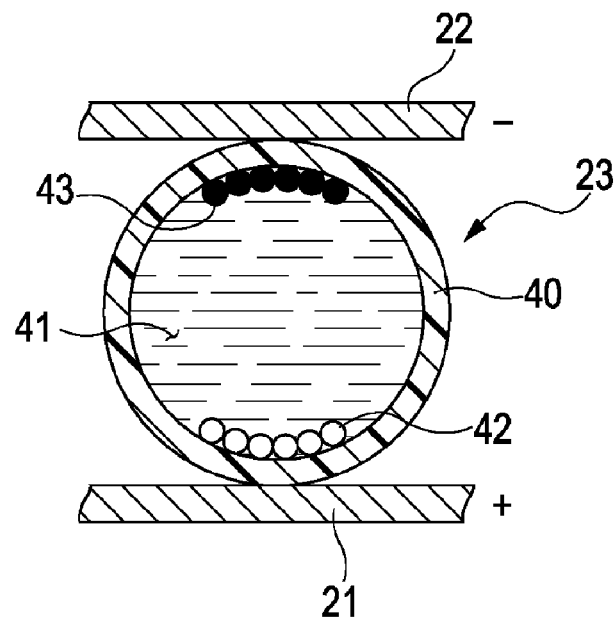

FIGS. 6A and 6B are diagrams for describing the operation of the electrophoretic particles inside the microcapsule 40. Here, an ideal case in which the ion layer 44 is not formed will be described as an example. When a voltage is applied between the pixel electrode 21 and the common electrode 22 such that the electric potential of the common electrode 22 is relatively high, as shown in FIG. 6A, the black particles 43 charged positively are attracted to the pixel electrode 21 side inside the microcapsule 40 by a coulomb force. On the other hand, in such a case, the white particles 42 charged negatively are attracted to the common electrode 22 side inside the microcapsule 40 by a coulomb force. As a result, the white particles 42 are collected to the display surface side (the opposing substrate 29 side) inside the microcapsule 40, and accordingly, the color (the white color) of the white particles 42 is displayed on the display surface.

To the contrary, when a voltage is applied between the pixel electrode 21 and the common electrode 22 such that the electric potential of the pixel electrode 21 is relatively high, as shown in FIG. 6B, the white particles 42 charged negatively are attracted to the pixel electrode 21 side by a coulomb force. On the other hand, in such a case, the black particles 43 charged positively are attracted to the common electrode 22 side by a coulomb force. As a result, the black particles 43 are collected to the display surface side of the microcapsule 40, and accordingly, the color (the black color) of the black particles 43 is displayed on the display surface.

In addition, by using a pigment, for example, of a red color, a green color, a blue color, or the like instead of the pigment used for the white particles 42 or the black particles 43, the electrophoretic display device 1 that displays the red color, the green color, the blue color, or the like can be implemented.

Method of Manufacturing Electrophoretic Display Device

For manufacturing the electrophoretic display device 1 having the above-described configuration, as shown in FIG. 3, the component substrate 28 side and the opposing substrate 29 side are formed, and then, the component substrate 28 side and the opposing substrate 29 side are bonded together in a state in which the electrophoretic layer 23 is pinched between the component substrate and the opposing substrate.

In other words, as the component substrate 28, the driving TFTs 24, the SRAMs 25, and various wirings are formed on a substrate (not shown) by using a general method, and then, the flattening layer (not shown) formed of an acrylic resin or the like is formed thereon. In a process for forming the driving TFTs 24 and the SRAM 25, it is preferable that poly-silicon TFTs are formed by performing a low-temperature poly-silicon process.

Figure 7A:
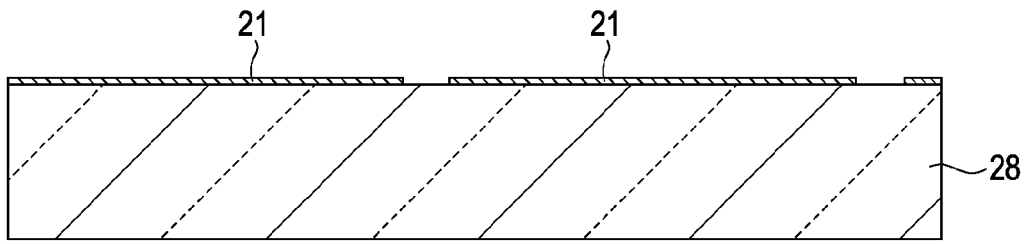
FIGS. 7A to 7D are diagrams for describing a method of manufacturing the electrophoretic display device.

Next, by forming an AlCu film (not shown) by using a sputtering method or the like on the component substrate 28 and patterning the AlCu film by using general resist technology, general etching technology, and the like, a plurality of the pixel electrodes 21 is formed as shown in FIG. 7A. Accordingly, an active matrix substrate can be acquired.

Figure 7B:
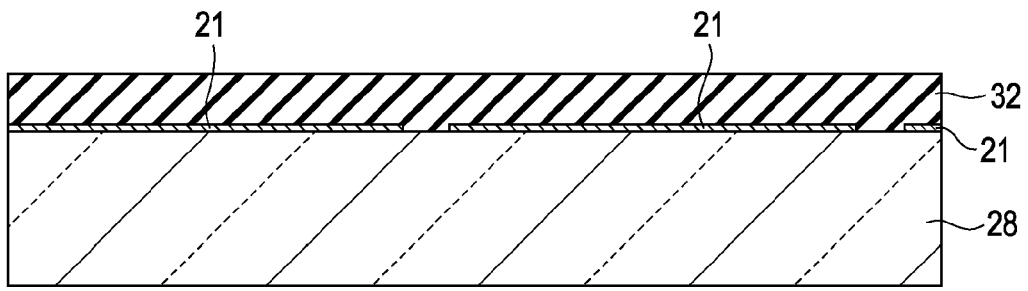

Subsequently, a photosensitive acrylic resin (a photosensitive insulating material) is coated on the substrate 28 so as to cover the pixel electrodes 21 by using a roller coating method, so that a photosensitive insulating material layer 32 is formed as shown in FIG. 7B. In such a case, it is preferable that the thickness of the insulating layer 31 acquired from the photosensitive insulating material layer 32 is equal to or larger than 1 μm and is equal to or smaller than 20 μm. Thus, in this embodiment, the photosensitive insulating material layer 32 is formed to have a thickness of about 1.8 μm.

Figure 7C:
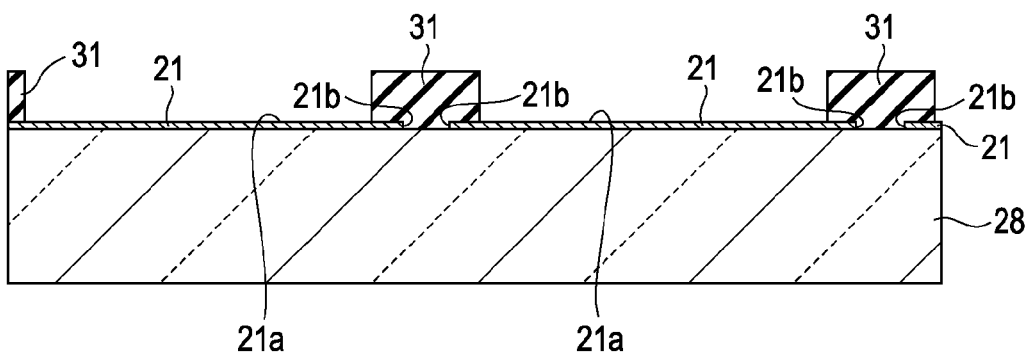

Subsequently, a patterning process is performed by exposing the photosensitive insulating material layer 32 by using a predetermined mask (not shown) and directly developing the photosensitive insulating material layer 32 for which the exposure process has been performed. Accordingly, as shown in FIG. 7C, the insulating layers 31 are formed to be continuous on the edge parts 21a of the surfaces of the adjacent pixel electrodes 21 and 21 and between the pixel electrodes 21 and 21. As the above-described photosensitive acrylic resin, either one of a positive type and a negative type may be used.

In addition, as the mask, a mask corresponding to its use form is used, naturally. In this embodiment, in order to perform the patterning process with high precision, a photosensitive acrylic resin of the positive type is used.

Figure 7D:
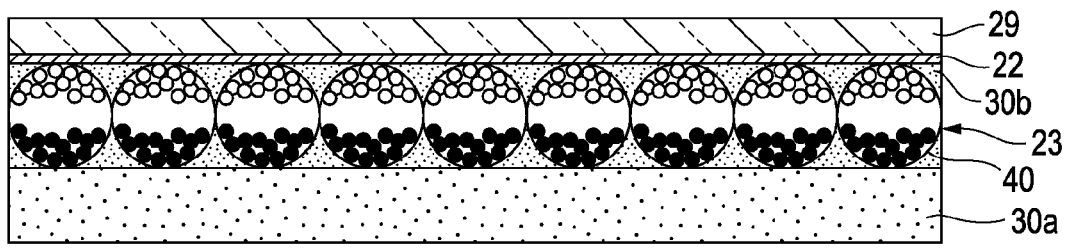

On the other hand, as the opposing substrate 29, a transparent substrate formed of PET (polyethylene terephthalate) or the like is prepared, and a film of a transparent conductive material such as ITO is formed on (the inner face of) the opposing substrate 29 so as to form the common electrode 22. Next, the microcapsules 40 are fixed on the common electrode 22 through the binder layer 30b so as to form the electrophoretic layer 23. Thereafter, on the inner face side of the electrophoretic layer 23, a conductive adhesive agent is coated so as to form the adhesive layer 30a. In this embodiment, in order to increase the conductivity of the adhesive layer 30a for increasing the responsiveness of the electrophoretic particles located inside the microcapsules 40, the thickness of the adhesive layer 30a is formed to be about 20 μm. Accordingly, as shown in FIG. 7D, the opposing substrate 29 in which the common electrode 22, the electrophoretic layer 23, and the adhesive layer 30a are formed is acquired.

When the component substrate 28 side and the opposing substrate 29 side are prepared as described above, the inner face sides thereof are brought into contact with each other and are bonded together with the adhesive layer 30a brought into contact with the pixel electrodes 21 and the insulating layers 31. Accordingly, as shown in FIG. 3, the electrophoretic display device 1 that is formed by bonding the component substrate 28 side and the opposing substrate 29 side together by the adhesive layer 30a is acquired.

Method of Driving Electrophoretic Display Device

Next, a method of driving the electrophoretic display device 1 according to this embodiment will be described.

FIG. 8 is a diagram showing a timing chart for the electrophoretic display device 1 according to this embodiment. In the diagram, the process of displaying an image by performing operations in the order of a power-off period, an image signal inputting period, an image display period, and a power-off period is shown. The operations are summarized in the following table.

TABLE 1

| SEQUENCE | PURPOSE OF OPERATION | STATE OF POWER SUPPLYING LINE | | STATE OF COMMON ELECTRODE 22 | DISPLAYED IMAGE |
|---|---|---|---|---|---|
| | | FIRST POWER SUPPLYING LINE 13 | SECOND POWER SUPPLYING LINE 14 | | |
| 1 | POWER-OFF PERIOD | CUT-OFF | CUT-OFF | CUT-OFF | ENTIRE IMAGE |
| 2 | IMAGE SIGNAL INPUTTING PERIOD | 5 V | 0 V | CUT-OFF | NO CHANGE |
| 3 | IMAGE DISPLAY PERIOD | HIGH LEVEL (15 V) | LOW LEVEL (0 V) | PULSE | NEW IMAGE |
| 4 | POWER-OFF PERIOD | CUT-OFF | CUT-OFF | CUT-OFF | NEW IMAGE |

First, the image signal inputting period will be described. The common power modulating circuit 8 shown in FIG. 1 drives the SRAM 25 shown in FIG. 2 by supplying about 5 V to the first power line 13 and supplying about 0 V as a low level to the second power supplying line 14.

The scanning line driving circuit 6 shown in FIG. 1 supplies a selection signal to the scanning line Y1. In accordance with this selection signal, the driving TFTs 24 of the pixels 2 connected to the scanning line Y1 are driven, and accordingly, the SRAMs 25 of the pixels 2 connected to the scanning line Y1 are connected to the data lines X1, X2, Xn.

The data line driving circuit 7 shown in FIG. 1 inputs image signals to the SRAMs 25 of the pixels 2 connected to the scanning line Y1 by supplying the image signals to the data lines X1, X2, ..., Xn.

When the image signals are received, the scanning line driving circuit 6 releases the selection state of the pixels 2 connected to the scanning line Y1 by stopping supply of the selection signal to the scanning line Y1. This operation is repeated until the operation is performed for the pixels 2 connected to the scanning line Ym for inputting image signals to the SRAMs 25 of all the pixels 2.

Next, the image display period will be described.

The common power modulating circuit 8 proceeds to the image display period by supplying a high-level electric potential of about 15 V to the first power supplying line 13.

When the SRAM 25 is driven at the high level, the image signal that is input to the SRAM 25 at 5 V is maintained at the high-level.

To the common electrode 22, a pulse signal in which a high-level period and a low-level period are repeated at regular intervals is input through the common electrode power supplying wiring 15 from the common power modulating circuit 8.

In the pixel 2 of which SRAM 25 receives an image signal of the low level, a high-level signal is input to the pixel electrode 21 from the SRAM 25.

Then, when the electric potential of the common electrode 22 to which the pulse signal is input is the low level, a large electric potential difference is generated between both the electrodes 21 and 22. Accordingly, the white particles 42 are attracted to the pixel electrode 21, and the black particles 43 are attracted to the common electrode 22. As a result, the black color is displayed in the pixel 2.

On the other hand, in the pixel 2 of which SRAM 25 receives an image signal having the electric potential of 5 V, a low-level signal is input to the pixel electrode 21 from the SRAM 25.

Then, when the electric potential of the common electrode 22 to which the pulse signal is input is the high level, a high electric potential difference is generated between both the electrodes 21 and 22. Accordingly, the black particles 43 are attracted to the pixel electrode 21, and the white particles 42 are attracted to the common electrode 22. As a result, the white color is displayed in the pixel 2.

When an image is displayed in the image display period, the common electric potential modulating circuit 8 electrically cuts off the power supplying lines 13 and 14 and the common electrode power supplying wiring 15 so as to be in the power-off period.

Suppression of Leakage Current

FIG. 9 is a schematic diagram showing adjacent pixels 2 (2A and 2B) of the display unit 3 shown in FIG. 1. The pixel 2A shown on the left side includes a driving TFT 24a, an SRAM 25a, and a pixel electrode 211. In addition, the pixel 2B shown on the right side includes a driving TFT 24b, an SRAM 25b, and a pixel electrode 212. Between the pixel electrodes 211 and 212, an insulating layer 31 is formed.

The SRAM 25a is configured by P-MOSs 25ap1 and 25ap2 and N-MOSs 25an1 and 25an2. In addition, the SRAM 25b is configured by P-MOSs 25bp1 and 25bp2 and N-MOSs 25bn1 and 25bn2.

To the adjacent pixels 21, different electric-potential signals are input. For example, a high-level signal is input to the pixel electrode 211, and a low-level signal is input to the pixel electrode 212. Accordingly, the black color is displayed in the pixel 2A, and the white color is displayed in the pixel 2B.

In such a case, between the pixel electrodes 211 and 212, an electric field is generated due to a large electric-potential difference. Accordingly, a leakage current can easily flow though the adhesive layer 30a.

In a general electrophoretic display device, the insulating layer 31 shown in FIG. 3 is not formed between the pixel electrodes 21 and 21, and thus, a leakage path cannot be cut off. Accordingly, in the general electrophoretic display device, a leakage current is generated due to a horizontal electric filed between the pixel electrodes 21 and 21. Since the conductivity of the adhesive layer 30a is set high for increasing the responsiveness of the electrophoretic particles inside the microcapsules 40, the leakage current can be easily generated.

To the contrary, according to this embodiment, the leakage path between the adjacent pixels 21 (211) and 21 (212), that is, the horizontal electric field is cut off by the insulating layer 31, and accordingly, generation of the leakage current can be suppressed sufficiently. In other words, since the insulating layer 31 is formed between the pixel electrodes 21 (211) and 21 (212), the leakage current flowing from the side end faces 21b of the pixel electrodes 21 can be cut off, and accordingly, the generation of the leakage current can be suppressed sufficiently. In addition, since the insulating layer 31 is formed to be continuous on the edge parts 21a of the surfaces of the adjacent pixel electrodes 21 (211) and 21 (212) and between the pixel electrodes, the leakage currents between the pixel electrodes 21 (211) and 21 (212) from each pixel electrode 21 are generated not from the edge part 21a covered with the insulating layer 31 but from exposed parts. Accordingly, the path between the leakage currents are lengthened (apart away), and thus, the leakage current therebetween can be suppressed. In addition, since the surface of the insulating layer 31 is configured to protrude from the surface of the pixel electrode 21 to the electrophoretic layer 23 side, the circuitous path of the leakage current that comes through the upper side of the insulating layer 31 is lengthened (apart away). Accordingly, the generation of the leakage current therebetween cannot be easily generated, and thereby the leakage current can be suppressed.

In addition, according to the method of manufacturing the electrophoretic display device 1, the insulating layer 31 is formed of a photosensitive acrylic resin. Accordingly, formation of the insulating layer 31, that is, patterning the insulating layer can be performed with high precision in an easy manner by using an existing exposure and development process.

As a result, reliability of the acquired electrophoretic display device 1 is improved by preventing deterioration of display performance due to the leakage current and preventing an increase in the consumption current. In addition, the insulating layer 31 used for suppressing the leakage current can be easily produced.

MODIFIED EXAMPLE

Figure 10:
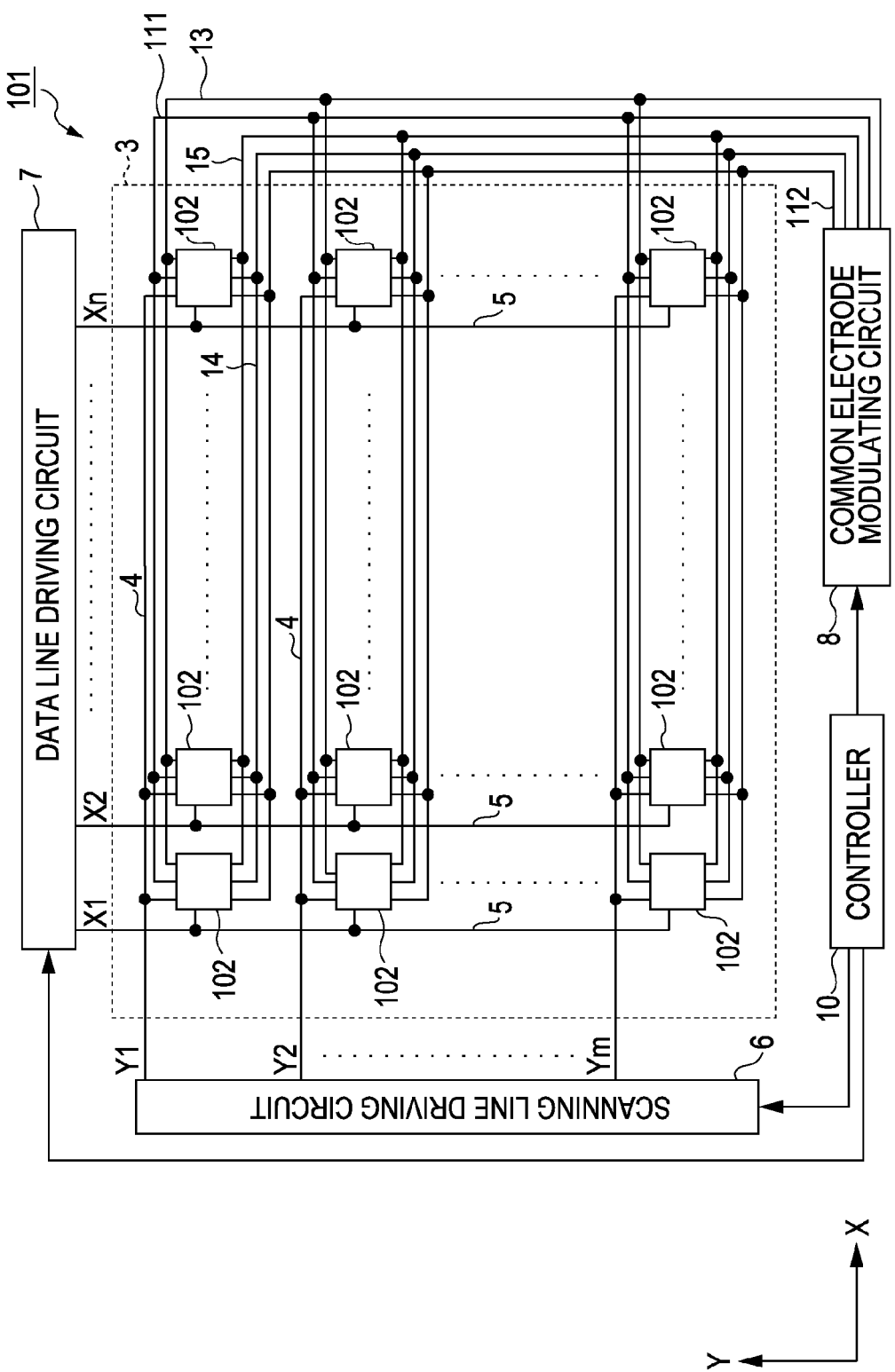
FIG. 10 is a diagram showing the configuration of an electrophoretic display device according to a modified example of the invention.

FIG. 10 is a diagram showing the configuration of an electrophoretic display device 101 according to a modified example of the invention. The difference between circuit configurations of the electrophoretic display device 101 and the above-described electrophoretic display device 1 is that the common power modulating circuit 108 is connected to the pixels 102 through a first control line 111 and a second control line 112 in the electrophoretic display device 101.

Figure 11:
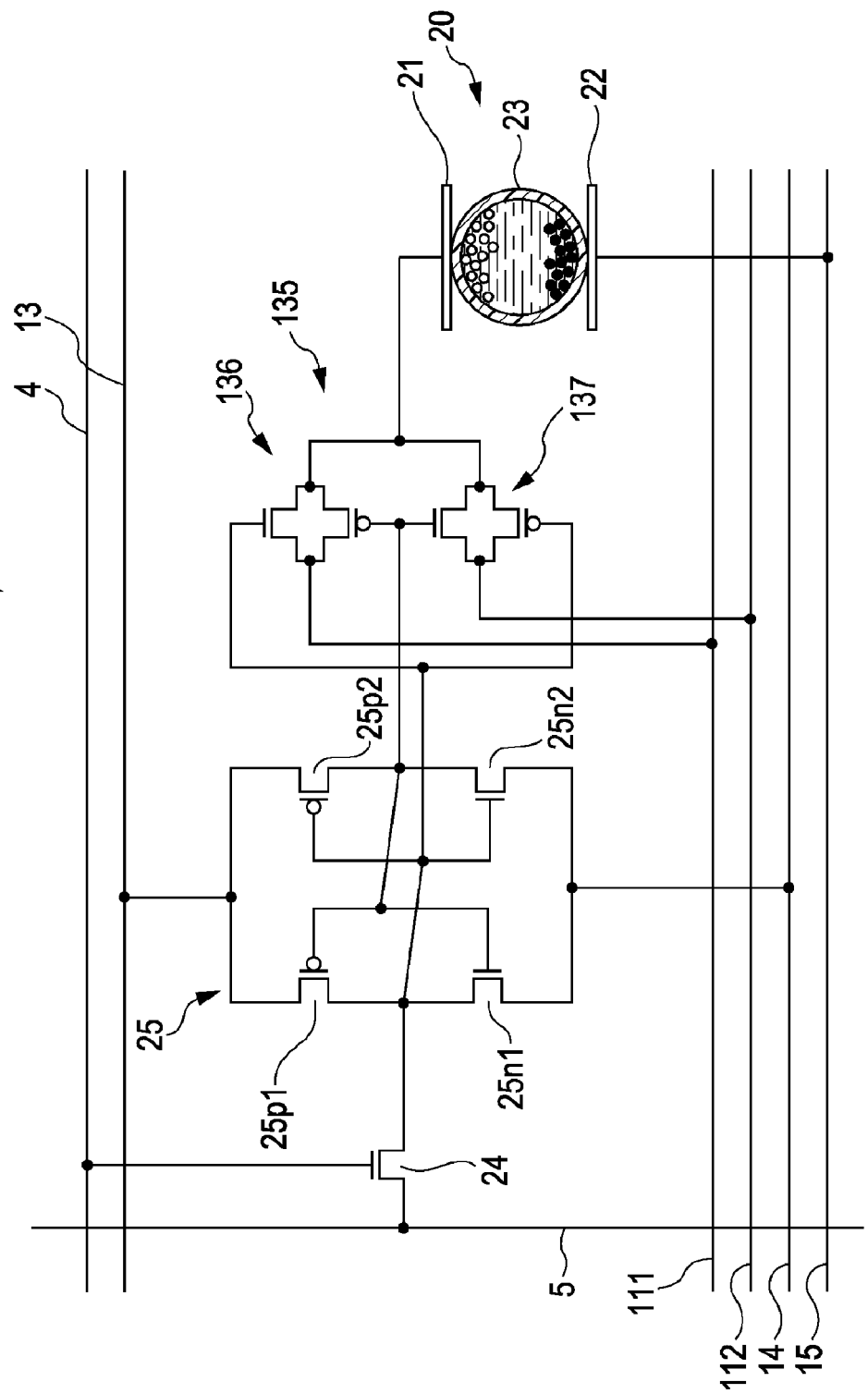
FIG. 11 is a circuit diagram of a pixel according to the modified example.

FIG. 11 is a circuit diagram of the pixel 102. In the pixel 102, a switching circuit 135 is disposed between the SRAM 25 and the first electrode 21. The switching circuit 135 includes a first transfer gate 136 and a second transfer gate 137. The transfer gates 136 and 137 are configured by a P-MOS and an N-MOS connected in parallel.

To the gates of the transfer gates 136 and 137, the SRAM 25 is connected. The source of the first transfer gate 136 is connected to the first control line 111. In addition, the source of the second transfer gate 137 is connected to the second control line 112. The drains of the transfer gates 136 and 137 are connected to the pixel electrode 21.

In the electrophoretic display device 101 shown in FIG. 10, any one transfer gate is driven based on an image signal input to the SRAM 125. The control line connected to the driven transfer gate is connected to the pixel electrode 21, and thus, the electric potential of the control line is input to the pixel electrode 21. Accordingly, an image is displayed in the pixel 102.

Also in the electrophoretic display device 101 having the circuit configuration shown in FIG. 11, when signals having different electric potentials are input to the adjacent pixels 102, an electric field due to the electric potential difference is generated. However, by disposing the insulating layer 31 shown in FIG. 3 between the pixel electrodes 21, the leakage current can be suppressed.

Second Embodiment

Figure 12:
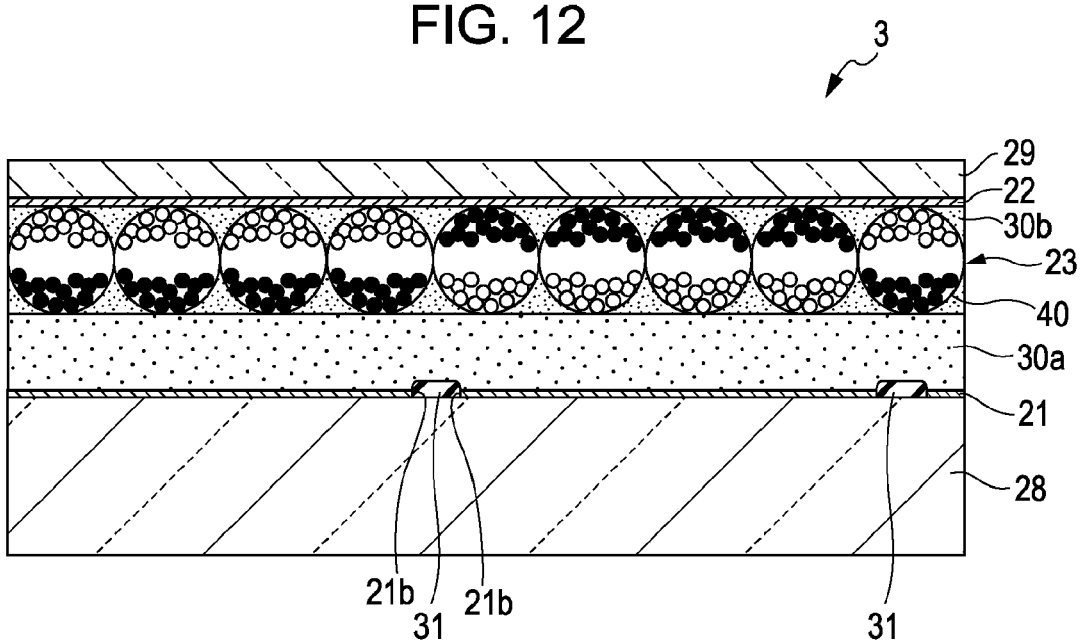
FIG. 12 is a partial cross-section view of a display unit according to a second embodiment of the invention.

FIG. 12 is a diagram showing an electrophoretic display device according to a second embodiment of the invention and is a cross-section view of major parts of a display unit 3 thereof.

The difference between the second embodiment and the first embodiment shown in FIG. 3 is the configuration of the insulating layer 31. The insulating layer 31 shown in FIG. 12 only covers an area between the pixel electrodes 21 and 21, and the surface of the insulating layer is formed to protrude from the surface of the pixel electrode 21 to the electrophoretic layer 23 side. However, when the leakage current can be suppressed sufficiently, the insulating layer may not protrude from the surface of the pixel electrode 21.

Figure 13:
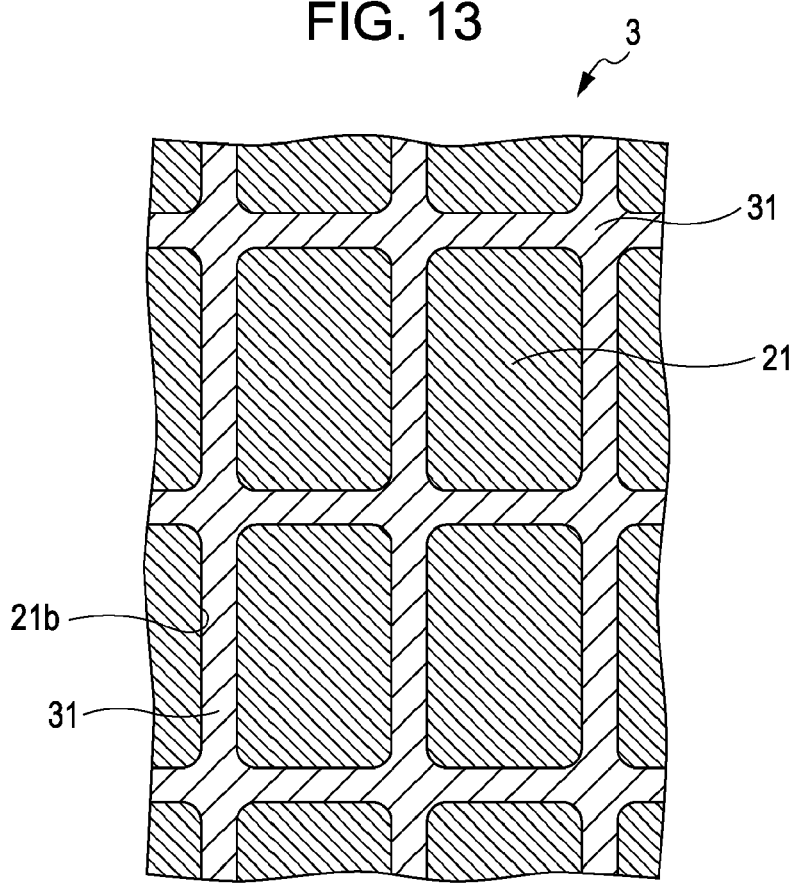
FIG. 13 is a plan view of a pixel electrode and an insulating layer according to the second embodiment.

FIG. 13 is a plan view of a display unit 3 according to the second embodiment, showing only the insulating layer 31 and the pixel electrodes 21. The insulating layer 31 is formed along the areas between the pixel electrodes 21 in the shape of a lattice in the plan view.

When the insulating layer 31 having the above-described structure is formed, the paths of leakage currents between the side end faces 21b of the adjacent pixel electrodes 21 and 21 are cut off by the insulating layer 31, and the leakage current can be suppressed. In addition, since the surface of the insulating layer 31 is formed to protrude from the pixel electrode 21 to the electrophoretic layer 23 side, the circuitous leakage current that flows through the upper side of the insulating layer 31 is cut off, and thereby the leakage current can be suppressed further. In addition, since the insulating layer 31 is not formed on the surfaces of the pixel electrodes 21, the effective area of the pixel electrode 21 for displaying an image can increase.

Third Embodiment

Figure 14:
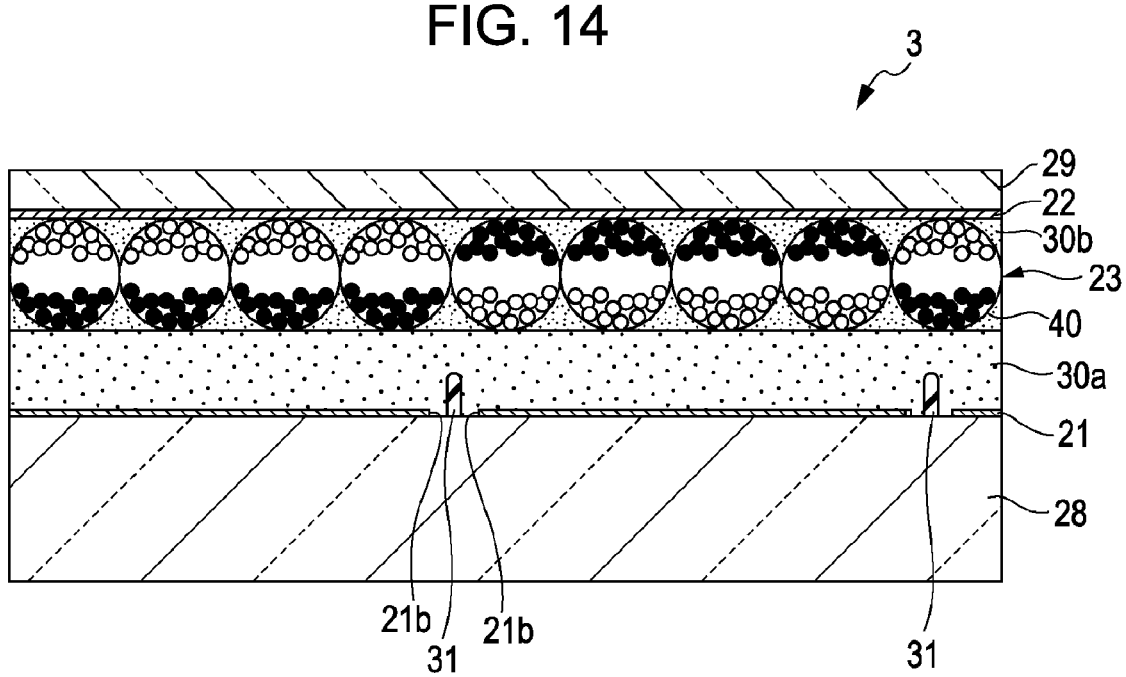
FIG. 14 is a partial cross-section view of a display unit according to a third embodiment of the invention.

FIG. 14 is a diagram showing an electrophoretic display device according to a third embodiment of the invention and is a cross-section view of major parts of a display unit 3 thereof.

The difference between the third embodiment and the first embodiment shown in FIG. 3 is the configuration of the insulating layer 31. The insulating layer 31 shown in FIG. 14 is formed only in center parts of areas between the pixel electrodes 21 and 21, and the insulating layer is formed to be spaced apart from the pixel electrodes 21. In addition, the surface of the insulating layer 31 is formed to protrude from the surface of the pixel electrode 21 to the electrophoretic layer 23 side.

Figure 15:
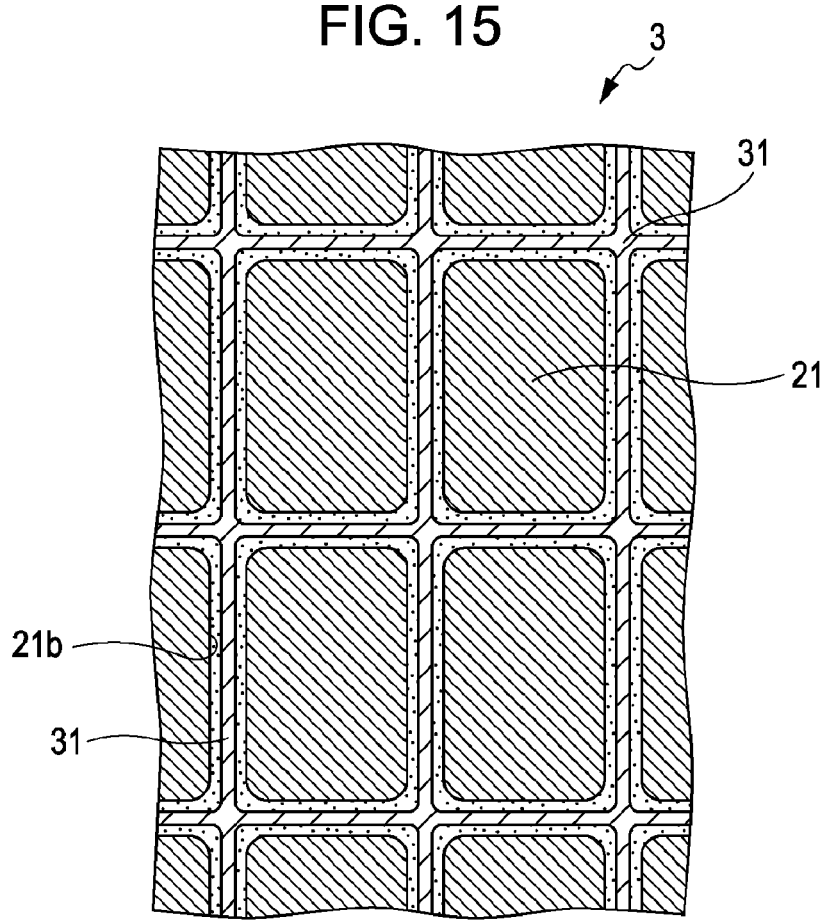
FIG. 15 is a plan view of a pixel electrode and an insulating layer according to the third embodiment.

FIG. 15 is a plan view of a display unit 3 according to the third embodiment, showing only the insulating layer 31 and the pixel electrodes 21. The insulating layer 31 is formed to surround the pixel electrodes 21 in the areas between the pixel electrodes 21 in the shape of a lattice in the plan view on the whole.

The insulating layer 31 formed as described above cuts off the paths of the leakage currents not also on the surface of the pixel electrodes 21 but also in areas between the pixel electrodes 21 and 21, and accordingly, the leakage currents can be suppressed. In addition, a groove between the pixel electrode 21 and the insulating layer 31 serves as a clearance groove of the adhesive layer 30a. Accordingly, the surface of the adhesive layer 30a can be easily flattened. In addition, since the insulating layer 31 is not formed on the surface of the pixel electrode 21, the effective area of the pixel electrode 21 for displaying an image can increase.

Fourth Embodiment

Figure 16:
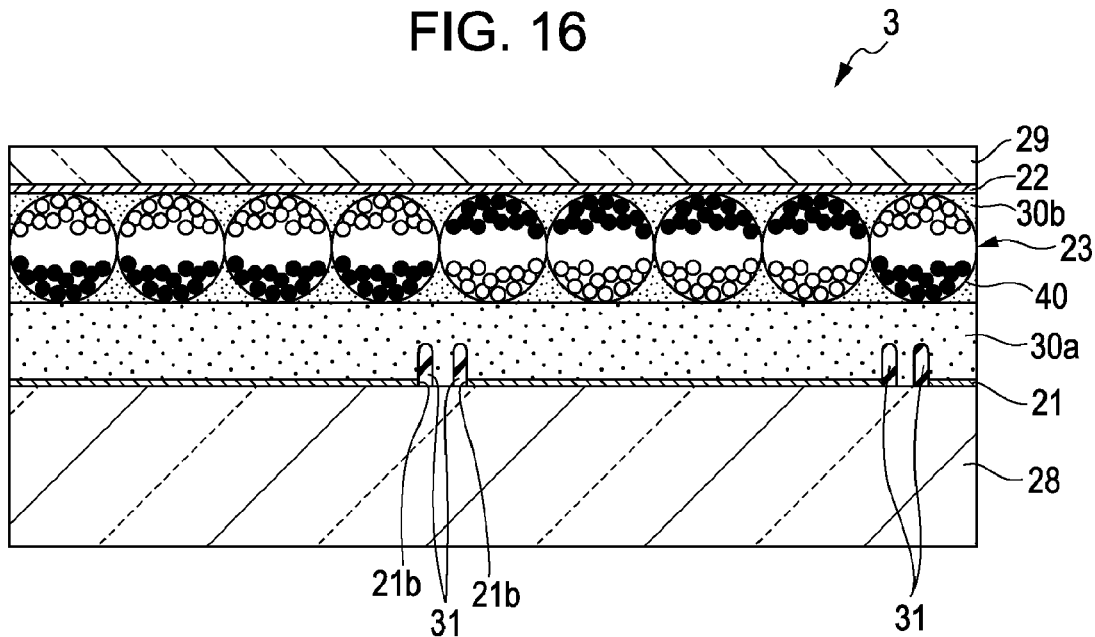
FIG. 16 is a partial cross-section view of a display unit according to a fourth embodiment of the invention.

FIG. 16 is a diagram showing an electrophoretic display device according to a fourth embodiment of the invention and is a cross-section view of major parts of a display unit 3 thereof.

The difference between the fourth embodiment and the first embodiment shown in FIG. 3 is the configuration of the insulating layer 31. The insulating layers 31 shown in FIG. 16 is formed to be brought into contact with the side end faces 21b of the pixel electrodes 21 and 21. In addition, the surfaces of the insulating layers 31 are formed to protrude from the surface of the pixel electrode 21 to the electrophoretic layer 23 side.

Figure 17:
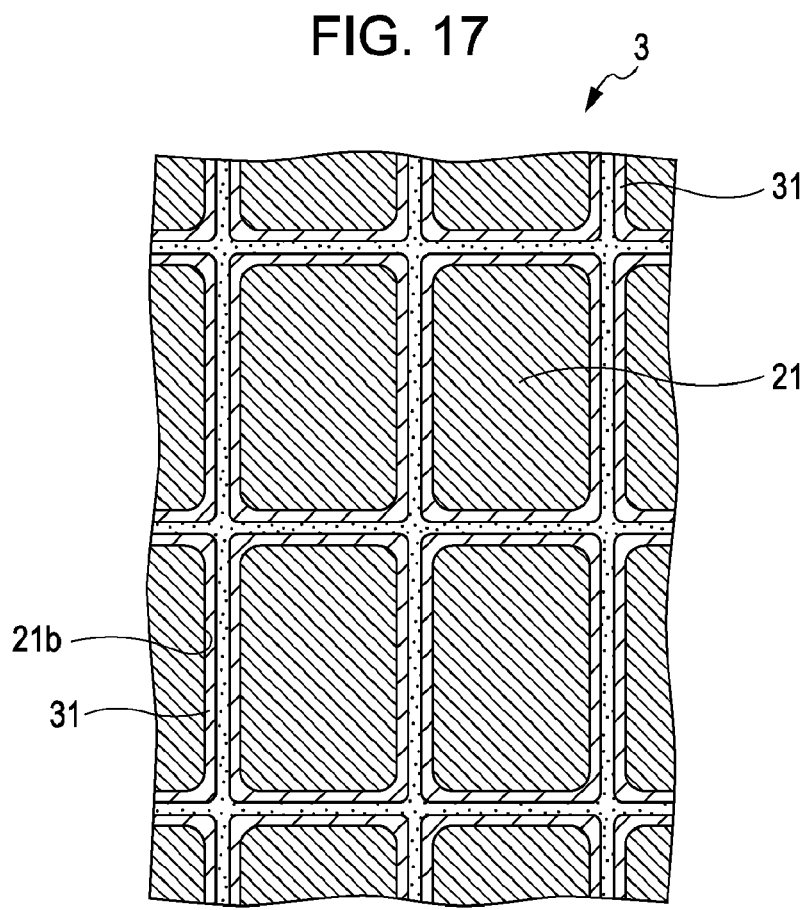
FIG. 17 is a plan view of a pixel electrode and an insulating layer according to the fourth embodiment.

FIG. 17 is a plan view of a display unit 3 according to the fourth embodiment, showing only the insulating layers 31 and the pixel electrodes 21. The insulating layer 31 is formed to surround the periphery of the pixel electrode 21.

The insulating layer 31 formed as described above cuts off the paths of the leakage currents from the side end faces 21b of the pixel electrodes 21, and accordingly, the leakage currents can be suppressed. In addition, since the surface of the insulating layer 31 is formed to protrude from the pixel electrode 21 to the electrophoretic layer 23 side, the circuitous leakage current that flows through the upper side of the insulating layer 31 is cut off, and thereby the leakage current can be suppressed further. In addition, since the insulating layer 31 is not formed on the surface of the pixel electrode 21, the effective area of the pixel electrode 21 for displaying an image can increase.

In addition, in the above-described second to fourth embodiment, the insulating layer 31 is formed of a photosensitive acrylic resin (a photosensitive insulating material), accordingly, formation of the insulating layer 31, that is, patterning the insulating layer can be performed with high precision in an easy manner by using an existing exposure and development process.

Electronic Apparatus

The above-described electrophoretic display device 1 can be used in various electronic apparatuses. Hereinafter, examples of electronic apparatuses having the above-described electrophoretic display device 1 will be described.

Figure 18:
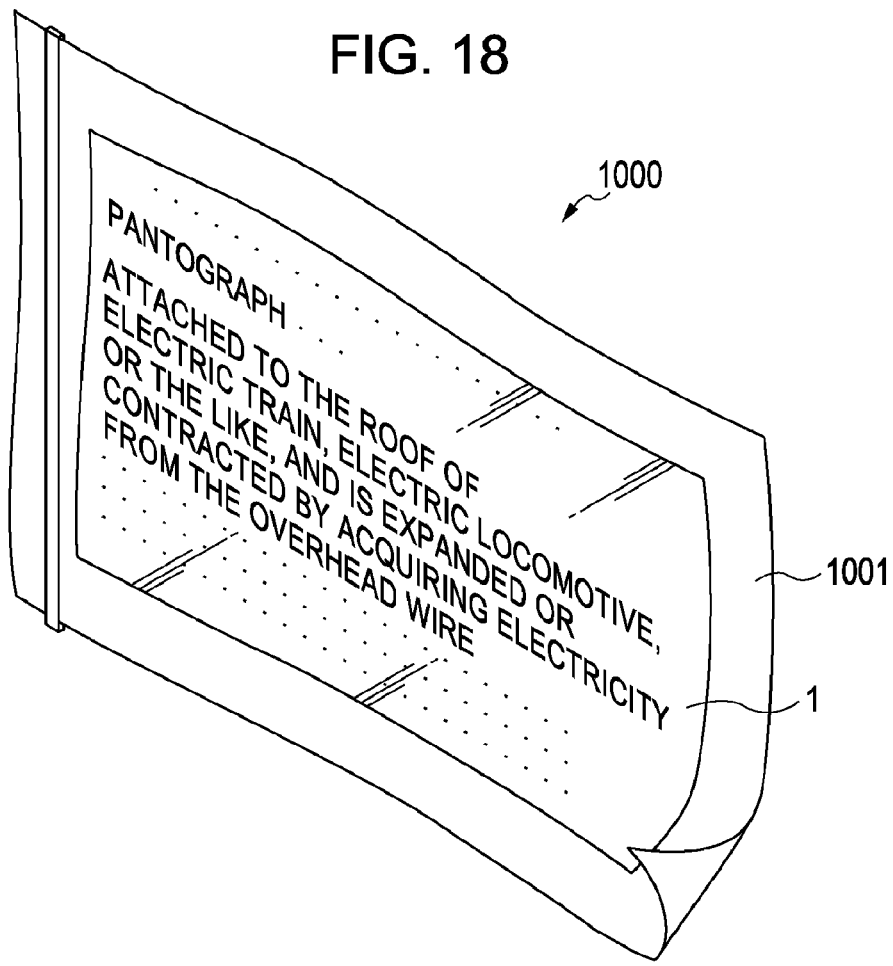
FIG. 18 is a diagram showing an example of an electronic apparatus having the electrophoretic display device according to an embodiment of the invention.

First, an example in which the electrophoretic display device 1 is used in a flexible electronic paper sheet will be described. FIG. 18 is a perspective view showing the configuration of the electronic paper sheet. The electronic paper sheet 1000 has the electrophoretic display device 1 according to an embodiment of the invention as a display unit. The electronic paper sheet 1000 has the electrophoretic display device 1 according to an embodiment of the invention on the surface of a main body 1001 formed of a sheet having the texture and flexibility that are the same as those of a general paper sheet.

Figure 19:
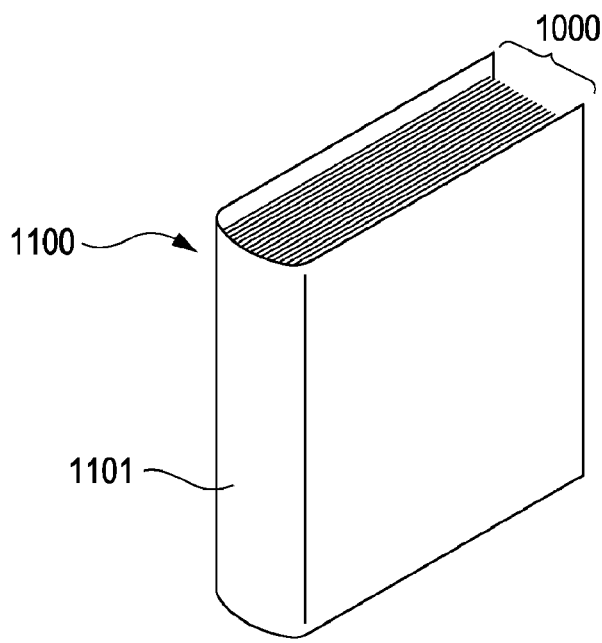
FIG. 19 is a diagram showing another example of an electronic apparatus having the electrophoretic display device according to an embodiment of the invention.

FIG. 19 is a perspective view showing the configuration of an electronic notebook 1100. The electronic notebook 1100 is formed by binding a plurality of the electronic paper sheets 1000 shown in FIG. 18 and inserting the electronic paper sheets into a cover 1101. In the cover 1101, a display data inputting unit (not shown) that receives display data, for example, transmitted from an external apparatus is disposed. Accordingly, the display content of the electronic paper sheets can be changed or updated in accordance with the display data in a state that the electronic paper sheets 1000 are bound.

In addition to the above-described examples, as other examples, there are a liquid crystal TV set, a view-finer type or monitor direct-view type video cassette recorder, a car navigation system, a pager, an electronic organizer, a calculator, a word processor, a workstation, a video phone, a POS terminal, an apparatus having a touch panel, or the like. The electrophoretic display device 1 according to an embodiment of the invention can be used in a display unit of any of the above-described electronic apparatuses.

What is claimed is:

1. An electrophoretic display device comprising:
   a first pixel electrode;
   a second pixel electrode adjacent to the first pixel electrode;
   an opposing electrode facing the first and second pixel electrodes;
   an electrophoretic layer configured by electrophoretic particles, the electrophoretic layer being disposed between the first and second pixel electrodes and the opposing electrode, an insulating layer including a photosensitive insulating material, and disposed in between the first pixel electrode and the second pixel electrode; and
   a conductive adhesive layer disposed between the electrophoretic layer and each of the first pixel electrode and the second pixel electrode,
   wherein the insulating layer does not overlap at least a portion of each of the first pixel electrode and the second pixel electrode in plan view.

2. The electrophoretic display device according to claim 1, and the electrophoretic layer, and
   wherein the thickness of the insulating layer is equal to or larger than 1 μm and is equal to or smaller than the thickness of the conductive adhesive layer.

3. The electrophoretic display device according to claim 1, wherein the photosensitive insulating material is a photosensitive acrylic resin.

4. The electrophoretic display device according to claim 1, wherein the insulating layer contacts a side end face of the first and second pixel electrodes.

5. The electrophoretic display device according to claim 1, wherein the insulating layer covers surfaces of the first and second pixel electrodes that face the opposing electrode.

6. The electrophoretic display device according to claim 1, wherein the insulating layer is disposed continuously on edge parts of the surfaces of the pixel electrodes and between the first and second pixel electrodes.

7. The electrophoretic display device according to claim 1, wherein the electrophoretic layer includes a microcapsule that encloses the electrophoretic particles, and the microcapsule being disposed over the first and second pixel electrodes with the conductive adhesive layer interposed therebetween.

8. A method of manufacturing an electrophoretic display device, the method comprising:
   forming a first pixel electrode and a second electrode over a first substrate, the second pixel electrode being adjacent to the first pixel electrode;
   forming a photosensitive insulating material layer by disposing a photosensitive insulating material over the first and the second pixel electrodes;
   forming an insulating layer in between the first and second pixel electrodes by exposing and developing the photosensitive insulating material layer for patterning the photosensitive insulating material such that the insulating layer does not overlap at least a portion of each of the first pixel electrode and the second pixel electrode in plan view,
   forming an opposing electrode over a second substrate;
   disposing a electrophoretic layer between the first substrate and the second substrate; and
   interposing a conductive adhesive layer between the electrophoretic layer and each of the first pixel electrode and the second pixel electrode.

9. The method according to claim 8, further comprising:
   bonding the first and second pixel electrodes and the electrophoretic layer by the conductive adhesive layer interposed therebetween,
   wherein, in the forming of the insulating layer, the insulating layer is formed to have a thickness equal to or larger than 1 μm and is equal to or smaller than the thickness of the conductive adhesive layer.

10. The method according to claim 8, wherein, in the forming of the insulating layer, a photosensitive acrylic resin is used as the photosensitive insulating material.

* * * * *